A switch operator has a low friction ratchet wheel driven by a low power time programmed clock to operate the switch in one position or another depending upon the position of the ratchet wheel to operate the ratchet wheel independent of the time programmed clock. A pawl resiliently held and biased away from the ratchet wheel engages the ratchet wheel when moving in a forward direction to move it a predetermined amount. A cam member mounted adjacent the ratch wheel is engaged by the pawl to bias the pawl against a projection on the ratchet wheel when the pawl is moved forward and to bias the pawl away from the ratchet wheel upon its return movement.

United States Patent [19]

Strand

[11] Patent Number: 4,788,520
[45] Date of Patent: Nov. 29, 1988

[54] RATCHET MEANS SWITCH OPERATOR

[75] Inventor: Rolf L. Strand, Crystal, Minn.

[73] Assignee: Honeywell Inc., Minneapolis, Minn.

[21] Appl. No.: 100,377

[22] Filed: Sep. 24, 1987

[51] Int. Cl.$^4$ ............................................. H01H 37/62
[52] U.S. Cl. .................................. 337/301; 200/33 R; 236/47
[58] Field of Search ............... 200/156, 33 R, 11 TW; 337/301, 302, 303; 236/47

[56] References Cited

U.S. PATENT DOCUMENTS

| | | | |
|---|---|---|---|
| 693,275 | 2/1902 | Jones et al. | 200/331 |
| 830,862 | 9/1906 | Swallow | 200/331 |
| 2,639,095 | 5/1953 | Cubberley | 236/37 |
| 3,749,871 | 7/1973 | Stoll et al. | 200/156 |
| 3,889,088 | 6/1975 | Zdanys et al. | 200/330 |
| 3,917,165 | 11/1975 | Cross | 236/47 |
| 4,150,264 | 4/1979 | Lieberman | 200/51 LM |
| 4,197,440 | 4/1980 | Debaigt | 200/324 |
| 4,447,689 | 5/1984 | Schiller | 200/330 |

OTHER PUBLICATIONS

Honeywell Brochure 60-2416-4, (Rev. 5-81), entitled "Chronotherm Fuel Saver Thermostat and Sub-base-T8082A, Q682A,B".

Primary Examiner—A. D. Pellinen
Assistant Examiner—Morris Ginsburg
Attorney, Agent, or Firm—Clyde C. Blinn

[57] ABSTRACT

4 Claims, 1 Drawing Sheet

RATCHET MEANS SWITCH OPERATOR

BACKGROUND AND SUMMARY OF THE INVENTION

In time programmed clock thermostats wherein the controlled temperature in a space is changed for comfort or energy saving during certain periods of the day or night, there is a need for manually overriding the time program at the home owner or occupant's will. Such has been done for many years in the T8082A Thermostat shown in the brochure Form No. 60-2416-4 revised 5/81 of Honeywell Inc. When a night time temperature is selected by the time programmed clock, such as 60°, the home owner may want to restore the temperature to the day time program. Such is done by a manual changeover button which operates the thermostat switch for the day time temperature. With the need to reduce the cost of such time programmed thermostats, a lower powered motor is used and the associated switch operator must require less power.

The present invention is concerned with a ratchet means for a switch of a time programmed clock thermostat which requires little power and is not greatly biased to prevent movement in a wrong direction. A manual operator for the ratchet means thus must operate in one direction and not produce any drag on the ratchet means in a retracting direction. Specifically, an indexing means is driven by a pawl which is biased against the ratchet means when the pawl is moved in a forward direction and biased away from the ratchet means when returning to an initial position by the use of a cam and cam rider attached to the pawl. With such an invention a large amount of power can be provided to the ratchet means by the pawl and yet the pawl will not adversely move the ratchet means upon its return to the initial position.

DESCRIPTION OF THE INVENTION

Figure 1:
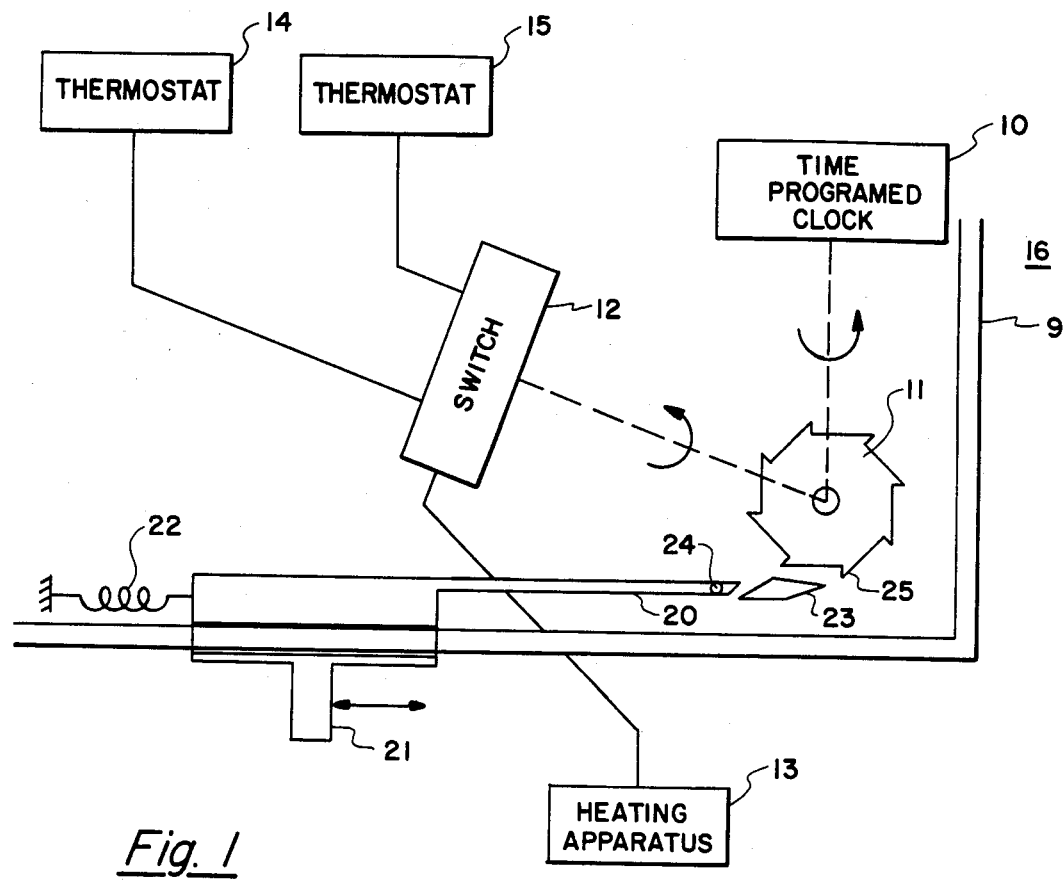
FIG. 1 is a schematic view of the control having a ratchet means with a manually operated pawl for moving the ratchet means a predetermined amount.

Referring to FIG. 1, a space temperature control or thermostat 9 has a time programmed clock means 10 connected to an indexing or ratchet means or cam or ratchet wheel 11 for operating a switch 12 upon predetermined angular segments of movement of ratchet means 11. Switch 12 is adapted to connect a temperature conditioning apparatus or heating apparatus 13 to either a temperature responsive switch means or thermostat 14 or a temperature responsive switch means or thermostat 15 which are set at different control points or temperatures for controlling the temperature in a space 16. Depending upon the time program of clock 10, thermostat 14 may control the heating apparatus during the day time to maintain one temperature in space 16 and thermostat 15 may control the heating temperature during the night time to maintain a different temperature in space 16 as would be selected by the home owner.

To provide for a manual changeover of the heating apparatus from one of the thermostats to the other, a pawl or push member 20 is connected to a member or button 21 for movement of the pawl to the right against a spring bias 22 to engage ratchet member 11 to move indexing means one segment or angle of rotation before returning to its present initial position. Pawl 20 is resilient and biased in the position shown. A cam or guide means 23 positioned adjacent the ratchet means is engaged by a cam rider 24 attached to pawl member to move pawl member 20 upward and into engagement with one projection 25 of ratchet means 11 to move the ratchet means one segment or angle of rotational movement. Upon passing the right end of cam 23, rider 24 drops off the cam and follows the cam on the under side in the return direction to be completely away from ratchet means to not drag the ratchet means in a reverse direction.

Figure 2:
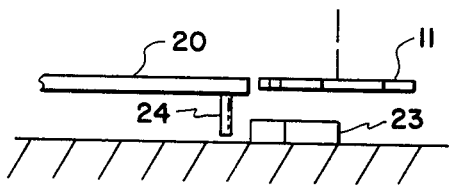
FIG. 2 is a lower view of FIG. 1 showing the cam and pawl with the cam rider for moving the pawl against the ratchet means.

As shown in FIG. 2, pawl 20 is in a plane of the ratchet means 11 and rider 24 projects below the pawl to engage the surface of cam 23. With such an arrangement, even though the ratchet means is slightly biased to provide a low load operation on the time program clock, the pawl does not drag over the indexing means in its reverse direction, but only in the forward direction when the pawl is moved to the right, as shown in FIG. 1, to move the ratchet means through the one segment of operation and thus to operate switch 12 to connect one or the other of the thermostats to the heating apparatus.

The embodiments of the invention in which an exclusive property right is claimed are defined as follows:

1. In a switch operator comprising:
   ratchet means connected to a switch means,
   first means movable toward and away from said ratchet means to move said ratchet means a predetermined amount, and
   guide means mounted adjacent said ratchet means for directing said first means against said ratchet means when said first means moves in a forward direction and for holding and directing said first means away from said ratchet means when said first means moves in a return direction.

2. The invention of claim 1 wherein the ratchet means is a ratchet wheel member which moves in one angular segment of operation of said first means and drives said switch means through an operation;
   said first means is a pawl means, and
   a rider is attached to said pawl means to engage said guide means for moving the pawl means to engage said ratchet wheel when said pawl means moves in said forward direction and away from the ratchet means in said return direction.

3. The invention of claim 2 wherein
   a time programmed clock is connected to said ratchet means,
   said switch means is adapted to connect one of at least two thermostats located in a space to a temperature conditioning apparatus,
   said pawl means is connected to a manually operated button for overriding the operation of the time programmed clock for switching one or the other of said two thermostats to the temperature conditioning apparatus for changing the temperature maintained in the space.

4. A temperature control for maintaining a selected temperature at selected times in a space comprising,
   first and second thermostat means,
   switch means adapted to connect either said first thermostat means or said second thermostat means to temperature conditioning apparatus furnishing temperature conditioned medium to the space, ratchet means to connect said switch means to operate said switch means to select which of said first or second thermostat means is to control the temperature conditioning apparatus, time programmed clock means, means connecting said time programmed clock means to operate said ratchet means to selected controlled space temperature by connecting one or the other of said first and second thermostat means to temperature conditioning apparatus during different selected times, a manually operated change means having a pawl for operating said ratchet means and said switch means to select either said first or second thermostat means for control of the temperature conditioning apparatus, and cam means mounted adjacent said ratchet means for biasing said pawl toward said ratchet means to engage said ratchet means when said change means is operated from an initial position in one direction and for biasing said pawl away from said ratchet means when said change means returns to said initial position.

* * * * *